3,308,174
PRODUCTION OF TETRAFLUOROETHYLENE
John Wilmar Edwards, Middlesex, and Stanley Sherratt and Percy Arthur Small, Welwyn Garden City, England, assignors to Imperial Chemical Industries Limited, London, England, a corporation of Great Britain
No Drawing. Filed Jan. 17, 1963, Ser. No. 252,024
Claims priority, application Great Britain, Jan. 24, 1962, 2,663/62; June 22, 1962, 24,038/62
9 Claims. (Cl. 260—653.5)

This invention relates to a process for the production of tetrafluoroethylene. It is an object of the present invention to provide a process for the production of tetrafluoroethylene at high conversions and high efficiency. Another object is to provide a process for the production of tetrafluoroethylene which is readily adapted to large-scale working. A further object is to provide a process for the production of tetrafluoroethylene in which the tetrafluoroethylene can be separated from the reaction mixture without undue difficulty. The reaction whereby monochlorodifluoromethane is converted by the agency of heat into tetrafluoroethylene and other compounds is normally referred to in the art as a pyrolysis reaction and it will be referred to as such in the present specification; and the zone in which the pyrolysis occurs will be referred to as the pyrolysis zone. We shall denote the fraction of the monochlorodifluoromethane that is pyrolysed in our process, that is to say converted into tetrafluoroethylene plus undesired side products, by the term "conversion"; the ratio of the number of moles of tetrafluoroethylene to half the number of moles of monochlorodifluoromethane that are pyrolysed by the term "efficiency"; and the ratio of the volume of the pyrolysis zone to the volume rate of flow of the gases therethrough, at the mean temperature of the gases (no allowance being made for the volume changes on pyrolysis), as the "contact time."

When monochlorodifluoromethane is pyrolysed at any temperature and pressure, as the conversion is increased (by the use of longer contact times) the efficiency decreases, so that the ratio of the unwanted side products to tetrafluoroethylene increases. These unwanted side products represent a loss of the starting material, and also present a problem in their disposal, since some of them are dangerously toxic. Further, their presence in the tetrafluoroethylene renders it unsuitable, or less suitable, for polymerisation, and purification of the tetrafluoroethylene by distillation is expensive. It is usually economically desirable to work at the highest conversions that do not cause excessive production of the side products. However, no statement about the economically optimum conversion at which to work can be generally valid. The economically optimum conversion will depend upon the partial pressures of monochlorodifluoromethane and diluent, if a diluent is used, in the gas mixture, amongst other factors.

In the pyrolysis of pure monochlorodifluoromethane at a given pressure to a given conversion at a constant gas temperature, the efficiency is a function of this constant temperature. If the temperature during the reaction is not constant, but rises or falls as the gas passes through the reactor, we have found that the efficiency for a given conversion depends mainly on the temperature of the gas at the exit from the pyrolysis zone, immediately before it enters the quench zone, rather than on the temperature at the entrance to the pyrolysis zone or the mean gas temperature. In the presence of a diluent at a given dilution ratio, the efficiency at a given conversion likewise depends mainly on the exit temperature at the end of the pyrolysis zone, at any particular total pressure or partial pressure of monochlorodifluoromethane, whether or not the pyrolysis is conducted at constant temperature.

The overall reaction leading from monochlorodifluoromethane to tetrafluoroethylene and hydrogen chloride may be written as follows:

$$2CHF_2Cl \rightleftharpoons C_2F_4 + 2HCl$$

and we have found that this reaction is reversible under conditions of temperature and pressure such as those typically used. As the number of molecules present increases during this reaction, the forward reaction is promoted relatively to the reverse reaction by reducing the total pressure, or by reducing the partial pressure of the reactants by diluting them with a gas that does not take part in the reaction. Further, both the standard entropy change and standard heat change of this reaction are positive, and in consequence the forward reaction is promoted relatively to the reverse reaction by raising the reaction temperature, or the temperature at the reactor exit when the temperature changes during the reaction.

We believe that the mechanism of this reaction is as follows:

$$CHF_2Cl \rightleftharpoons CF_2 + HCl$$

$$2CF_2 \rightleftharpoons C_2F_4$$

It is now well established that difluorocarbene, $CF_2$, is capable of existence; we believe that it is highly reactive and present in only minute concentrations during the reaction, and it is not found amongst the products after quenching.

The unwanted side products are mainly of higher boiling point than tetrafluoroethylene, and are therefore often called "high boilers." The main constituents of these high boilers are hexafluoropropene and its isomer hexafluorocyclopropane, both of formula $C_3F_6$, octafluorocyclobutane $C_4F_8$, monochlorotetrafluoroethane $C_2HF_4Cl$, and monochlorohexafluoropropane $C_3HF_6Cl$. Compounds with more than four carbon atoms in the molecule may also be present, but in decreasing amounts as the number of carbon atoms increases. The reactions leading to the formation of all these compounds from $C_2F_4$, $CF_2$, HCl and $CHF_2Cl$ are reactions in which the number of molecules decreases. In consequence, lowering the total or partial pressure of these reactants, or raising the temperature at the exit from the pyrolysis zone, or both, tend to decrease the extent to which these products are formed relative to the desired products.

The use of low total or partial pressures of the reactants, or of higher temperatures, thus improves the relation between conversion and efficiency. It has previously been proposed to use inert gases such as nitrogen or helium as diluents in the pyrolysis of monochlorodifluoromethane. Such materials cause difficulties in separation, and lead to a lower recovery of tetrafluoroethylene.

We have now found that if at least three moles of steam are present as diluent for each mole of monochlorodifluoromethane the relation between conversion and efficiency is improved, so that, for instance, a higher conversion can be obtained (at the same efficiency) than when monochlorodifluoromethane is pyrolysed in the absence of steam or in the presence of less than three moles of steam per mole of monochlorodifluoromethane at the same exit temperature and total pressure, or alternatively a higher efficiency at the same conversion. At the same time, the desired tetrafluoroethylene product is readily separated from the gas mixture resulting from the pyrolysis. If the efficiency is plotted as ordinate against the conversion as abscissa, for varying contact times, the curve so obtained for our process lies above the curve obtained when monochlorodifluoromethane is pyrolysed in the absence of steam or in the presence of less than three moles of steam per mole of monochlorodifluoromethane at the same exit temperature and total pressure.

It is not normally desirable for the partial pressure of steam to be more than 95% of the total pressure, as otherwise the size of plant required for obtaining a given output of tetrafluoroethylene becomes excessively large, and losses due to hydrolysis may be considerable. Accordingly the present invention provides a process for the production of tetrafluoroethylene in which a mixture of monochlorodifluoromethane and from three to nineteen, particularly between 6 and 10 moles of steam per mole thereof, is passed through a zone in which the monochlorodifluoromethane is pyrolysed and the pyrolysis mixture is then quenched.

For a given throughput the contact time and the size of reactor needed both decrease with increase in temperature; on the other hand, the diluent ratio (mole of steam/mole of $CHClF_2$) will need to be increased with increase in temperature. The variables affecting the efficiency of the process are so interlinked that the precise choice of operating conditions will be more a matter of prevailing economic considerations than of purely technical reasons.

Although, as we have stated, the use of inert gases such as nitrogen or helium as diluents in the pyrolysis of monochlorodifluoromethane has previously been proposed, this proposal has technical disadvantages which have hindered its practical application. It is surprising that the hydrolysis of monochlorodifluoromethane by steam, at gas temperatures in the range 500–1000° C., is slow enough for the use of such large amounts of steam as a diluent as are employed in the present invention to be not only practicable but even extremely advantageous.

Some hydrolysis does occur, and carbon monoxide and hydrogen fluoride are found in the products of the reaction when steam is present, but the loss of efficiency due to hydrolysis may be surprisingly low, and more than counter-balanced by the lowering in the loss of efficiency due to high boiler formation, even at dilution ratios approaching twenty. If fewer than three moles of steam per mole of monochlorodifluoromethane at a total pressure of one atom are used, less hydrolysis occurs, but the proportion of high boilers formed is greater at comparable conversions than in the process of the present invention at the same total pressure and there is less net gain in efficiency over the diluent-free process at the same total pressure.

The extent to which hydrolysis occurs under given reaction conditions appears to be rather variable and erratic, and we have observed some dependence upon the condition of the reactor surface, which makes us suspect that the reaction, or part of it at least, may be a surface reaction. Thus in a series of runs in the platinum reactor described in Example 1, carried out under similar conditions, the loss of efficiency due to carbon monoxide formation decreased from one run to the next, finally reaching a fairly steady value. The data given in this example were obtained after this steady state had been reached. Also, it was observed when the "Inconel" reactor of Example 2 was exchanged for a fresh one that the efficiency loss due to carbon monoxide was greater than expected; the old reactor, which had been in use for more than 200 hours, had a blackened surface apparently of metallic oxides.

Accordingly, not all materials that are capable of withstanding the high temperatures and corrosive conditions of the reaction may be equally suitable for the construction of reaction vessels, as some surfaces may catalyse the hydrolysis. Platinum and "Inconel" are suitable materials for this purpose. ("Inconel" is a registered trademark and is used, in this specification and in the appended claims, to denote alloys comprising: Ni, at least 72%; Cr, 14–17%; Fe, 6–10%; Mn, at most 1%; Cu, Si, C, S (together), less than 1%.) Other suitable materials for reactor construction are copper, copper-nickel alloys, silver, platinum-iridium, platinum-rhodium, carbon, or single or mixed sintered metal oxides such as alumina, beryllia, magnesia or spinels. Refractory materials such as alumina, beryllia, magnesia or spinels when used as linings to metal tubes or when rigidly held at both ends are somewhat liable to thermal shock under the conditions encountered and may need to be frequently replaced.

At any given degree of conversion and given temperature at the reactor exit, the losses of efficiency due to high-boiler formation decrease as the dilution ratio is increased, but those due to hydrolysis increase. There is a dilution ratio at which the total efficiency loss is least, i.e. the efficiency is highest, but in so far as the hydrolysis reaction is a surface reaction it will depend on the size, shape and material of the reactor, so that no statement concerning the dilution ratio that gives the highest efficiency can be generally valid. However, as an illustration, in the reactor used in Example 1, this dilution ratio appears to be about 9 at 700° C. exit temperature and 70% conversion, for the aged reactor; the dilution ratio that gives the highest efficiency increases with increasing conversion and increasing exit temperature.

The size of plant required for a given output of monomer will increase with the dilution ratio selected, and this applies not merely to the reactor but also to the plant needed to produce the hot steam, and to condense the steam out of the gases coming from the reactor. The cost of generating the steam will likewise increase with the dilution ratio, and so will the inevitable losses of organic materials by solution in the aqueous condensate. The economically optimum dilution ratio will therefore be rather lower than that which gives the highest efficiency.

The contact time is an important variable since it controls the conversion, as also does the pyrolysis temperature, the contact time necessary to attain a given conversion decreasing as the temperature of the mixture rises. Relatively short contact times should be used, generally less than 0.2 second at a gas temperature of 800° C., less than 1 second at 700° C., and less than 6 seconds at 600° C.; preferably, less than 0.04 second at a gas temperature of 800° C., less than 0.2 second at 700° C. and less than 1 second at 600° C. Those skilled in the art will be able to estimate the preferred maximum contact times at other temperatures from these figures, since the logarithms of the contact times quoted depend linearly on the reciprocals of the absolute temperature.

Normally the contact time will be at least 0.01 second because of practical considerations such as permissible flow rates. At gas temperatures below 500° C., the reaction rate is so low that very little or no conversion takes place at practicable contact times. At high temperatures, for instance temperatures appreciably above 900° C., the materials of construction for the apparatus become prohibitively expensive, and the contact time becomes so short that the flow rates become inconveniently large and there is great difficulty in cooling the hot gases sufficiently rapidly to stop the reaction at the required conversion. Preferred temperatures to use are from 600 to 800° C., particularly 650 to 800° C.

Our process may be carried out by continuously passing a mixture of steam and monochlorodifluoromethane through the pyrolysis zone, and applying heat to the mixture in said zone. Conveniently, the pyrolysis zone may be in the form of a hot tube heated to the desired temperature by electrical or other means. The tube should be constructed of, or alternatively lined with, material resistant to attack by the hot gases at the operating temperature, e.g. platinum. Other inert materials of construction may be used however. Preferably the monochlorodifluoromethane and/or steam fed to the pyrolysis zone is/are pre-heated. For example, the monochlorodifluoromethane may conveniently be pre-heated to a temperature of from 300 to 500° C., very suitably from 400 to 500° C., and the steam to 800–1000° C.

The figures given above relate to such isothermal processes. On the full-scale plant it is difficult at high reaction temperatures (these may involve contact times of for instance only 0.03 to 3 seconds) to supply any significant part of the heat of the endothermic reaction fast enough through the walls of the reactor. We therefore prefer to carry out the pyrolysis substantially adiabatically, that is, all, or almost all of the heat reaction is supplied by the monochlorodifluoromethane and/or steam, in a well-lagged elongated tube, channel or duct, since the problem of heat transfer across the walls of the reactor which is created by the need to supply the heat of the rapid endothermic reaction is thereby eliminated. It is also possible to use slightly lower steam temperatures than are are required for adiabatic operation and to supply part of the heat through the walls. Plug flow conditions, with good local turbulence and mixing, but no back mixing, at a Reynolds number greater than 3000 are preferred.

It is desirable to make special provision for good mixing of the steam and monochlorodifluoromethane at the entrance to the reactor, especially if the Reynolds number in the reactor is lower than 3000, or the reactor is not tubular in form.

If desired, the steam may be mixed in with the monochlorodifluoromethane in two or more stages, so that the initial temperature of the mixture, before reaction has occurred, is lower than if all the steam were mixed in at once. However, we prefer to mix all the steam in at once, for simplicity.

In the case of adiabatic operation it is not feasible to quote reaction temperatures, since there is a very rapid drop in temperature over what may be a very small fraction of a second, and the best method of characterising the reaction conditions, as we have already explained, is to give the exit temperature; this is preferably from 600–800° C., particularly 650–800° C. Since the steam has to supply more of the reaction heat than is necessary in isothermal operation using an externally heated reactor, although this is partly compensated for by the increased proportion of steam present, it is preferred that the steam is heated to not less than 900° C. Technical difficulties set an upper limit to the steam temperature; in general it is not convenient to superheat steam to temperatures greater than about 1000° C.

The dilution ratio that is required to obtain a specified conversion at a given exit temperature can be calculated from the temperatures of the steam and monochlorodifluoromethane prior to mixing, and the published heat capacities of the gases, together with the heat of reaction, due allowance being made for any loss or gain of heat by the gases as they pass through the pyrolysis zone. We have found that the heat of the endothermic reaction is approximately 30 kilocalories per mole of $C_2F_4$. No allowance need ordinarily be made for heat changes associated with the formation of high boilers or carbon monoxide, since these reactions will only occur to a small extent under favourably chosen working conditions, and their effect on the exit temperature is negligible.

The monochlorodifluoromethane may be fed at or below room temperature or pre-heated to temperatures up to 600° C. Temperatures in the range 300–500° C. are very suitable. It will be understood that the hotter the monochlorodifluoromethane the less steam will be required initially, or, alternatively, cooler steam may be used. The monochlorodifluoromethane should however not be allowed to undergo any substantial degree of pyrolysis before dilution by the steam, since the advantages of the invention would thereby be lost to a proportionate extent. It is preferred that at the very most 10% of the monochlorodifluoromethane should be pyrolysed before dilution.

The hydrolysis reaction, besides causing a direct loss of starting material, produces carbon monoxide, which causes difficulties in separation, so entailing further losses. Furthermore, the hydrogen fluoride produced is corrosive and toxic. These difficulties may be more serious than the mere loss by destruction of the starting material. Oxygen reacts under the conditions of this reaction to give carbon dioxide and hydrogen fluoride, and the steam used should have a low oxygen content. Further, hydrogen also reacts to give hydrogen fluoride together with other undesirable hydrogen-containing products, and the steam used should also have a low hydrogen content. We therefore prefer to generate the hot steam required in one embodiment of this process by superheating ordinary steam produced by boiling water, rather than by burning oxygen and hydrogen together, on account of the difficulty of proportioning these two gases accurately so that neither is in excess. Other impurities in the steam can lead to either difficulties in the distillation process or loss of tetrafluoroethylene when these impurities are purged from the distillation system.

We prefer that the steam used in the process of this invention shall have a total content of less than 1000 parts per million by volume of other gases, and shall be substantially free of non-volatile impurities.

A very suitable grade of monochlorodifluoromethane is that sold as "Arcton 22." ("Arcton" is a registered trademark.)

The total pressure of the mixture is not critical and may be sub-atmospheric, atmospheric or super-atmospheric. For convenience of operation and in particular for preventing leakage of gases into or out of the apparatus used, for instance through joints, it is preferred to work at a pressure of about one atmosphere absolute, although pressures of for example 0.1 to 5 atmospheres may conveniently be used.

For a given conversion in an adiabatic reactor, the contact time required will depend mainly on the conversion and the exit temperature, but also in some degree on the dilution ratio, which in turn will depend on the temperatures of the steam and monochlorodifluoromethane prior to mixing.

The following approximate contact times relate to a substantially adiabatic reaction using mixtures of steam at about 950° C. and monochlorodifluoromethane at about 400° C., at 1 atmosphere total pressure; at 650° exit temperature: 0.045, 0.055, 0.07 and 0.10 seconds for 40, 50, 60 and 70% conversion respectively; at 700° exit temperature: 0.035, 0.045, 0.06 and 0.09 seconds for 50, 60, 70 and 80% conversion; at 750° exit temperature: 0.03, 0.035, 0.05 and 0.08 seconds for 60, 70, 80 and 90% conversion; at 800° exit temperature: 0.02, 0.03, and 0.04 seconds for 70, 80 and 90% conversion respectively. No simple equation can be given for these contact times on account of the kinetic complexity of the reaction.

The gases leaving the pyrolysis zone should be cooled to condense the steam, washed to remove hydrochloric acid and then dried. Cooling may be effected by passing the gases through heat exchange apparatus, e.g. a tubular vessel, jacketted with cooling fluid, or alternatively by injecting water, cool steam, or aqueous hydrochloric acid solution into the gases, or by a combination of both methods. Rapid cooling is especially desirable when the temperature of the mixture in the pyrolysis zone has exceeded 750° C. The cooled gases are then if desired washed, normally by passing them counter-current to a spray of water, or an aqueous hydrochloric acid solution, followed by scrubbing with aqueous caustic alkali. The washing step can however often be conveniently combined with the cooling step. Drying may be accomplished using e.g. concentrated suphuric acid. The dried gases may then be compressed and subjected to fractional distillation whereby unreacted monochlorodifluoromethane (boiling point—40.8° C./760 mm. Hg) and tetrafluoroethylene (boiling point—76.3° C./760 mm. Hg) are separated. If desired, unreacted monochlorodifluoromethane may be returned for re-admixture with steam.

Very good efficiency is obtained at conversions as high as 80%. As a result of this the amount of monochlorodifluoromethane to be re-cycled is small; this is very desirable on economic grounds. Our invention is illustrated by the following examples.

Example 1

Monochlorodifluoromethane was mixed with steam in a ratio of 3 moles $H_2O$ per mole $CHClF_2$ and passed continuously at atmospheric pressure through a pre-heater which raised its temperature to about 400° C. and then through a pipette-shaped platinum reaction tube in an electric oven. The gas temperature was measured by means of a thermocouple in the gas stream, and was substantially constant within the bulb of the pipette-shaped reactor. The gases emerging from the reaction were rapidly cooled, and samples were taken for analysis by gas-liquid partition chromatography. The results obtained at various contact times at a gas temperature of 700° C. are tabulated below. The contact time is calculated by dividing the volume of the bulb of the pipette-shaped reactor by the volume rate of flow of the gases at 700° C., no allowance being made for the volume changes on reaction.

| Contact Time, seconds | Conversion, percent | Efficiency, percent |
|---|---|---|
| 0.17 | 66.3 | 93.1 |
| 0.17 | 67.0 | 93.5 |
| 0.27 | 69.3 | 90.8 |
| 0.28 | 67.9 | 89.4 |
| 0.31 | 76.0 | 90.0 |
| 0.38 | 75.0 | 88.6 |
| 0.40 | 77.5 | 88.0 |
| 0.64 | 80.2 | 84.5 |

In a series of control experiments not illustrative of our invention, monochlorodifluoromethane was pyrolysed in the same apparatus but without any admixture of steam; in other respects the procedure was the same, the pressure being atmospheric, the gas being pre-heated to about 400° C. and then heated to 700° C. in the pipette-shaped reactor. The following results were obtained:

| Contact Time, seconds | Conversion, percent | Efficiency, percent |
|---|---|---|
| 0.25 | 67.5 | 67.5 |
| 0.36 | 68.0 | 65.9 |
| 0.48 | 73.9 | 61.5 |
| 0.78 | 78.5 | 47.7 |

Example 2

Monochlorodifluoromethane was passed via a "Rotameter" flow-meter and a tubular preheater into one of two opposed mixing jets at the entrance to a lagged and heated tubular reaction vessel constituting the pyrolysis zone, which was 48 inches long and 1 inch internal diameter, made of the alloy "Inconel," while steam was passed via an orifice-plate flow-meter and a superheater into the other mixing jet. The temperatures of the two gases immediately before mixing, of the mixture immediately after mixing and at the exit from the reactor, and of the wall of the reaction vessel, were measured by means of thermocouples and recorded automatically. The heat input to the winding on the reaction tube was controlled so that the wall temperature was as close as possible to the mean of the two temperatures of the gas mixture, so that the net heat flow into the gas mixture was negligible, and the reaction was substantially adiabatic. The gases leaving the pyrolysis zone were quenched by being mixed with sufficient steam at just over 100° C. to bring their temperature, which was measured by another thermocouple, to 300–400° C. and then passed to a carbon-block cooler, which was followed by a condenser which separated most of the hydrochloric acid and then a scrubbing system to remove the final traces of hydrochloric acid. The pressure in the reaction vessel was approximately 1 atmosphere absolute.

The product gases were analyzed by gas-liquid partition chromatography for monochlorodifluoromethane, tetrafluoroethylene, the high-boiler impurities mentioned earlier, other trace impurities such as fluoroform, and carbon monoxide. The conversion and efficiency were calculated from the results, by means of the following relations:

$$\text{Percent Conversion} = \frac{100(2[C_2F_4] + \epsilon_x C_x[x])}{[CHClF_2] + 2[C_2F_4] + \epsilon_x C_x[x]}$$

$$\text{Percent Efficiency} = \frac{100 - 2[C_2F_4]}{2[C_2F_4] + \epsilon_x C_x[x]}$$

where quantities in square brackets are the mole fractions of the substance indicated in the pyrolysis gases; $x$ represents any of the substances present other than $C_2F_4$ or $CHClF_2$, and $C_x$ is the number of carbon atoms in the molecule of $x$. The summation indicated is taken over all the high boilers, trace impurities, and also carbon monoxide.

The monochlorodifluoromethane used was analyzed in the same way and found to contain 0.062% of fluoroform as the only significant impurity.

The results obtained are tabulated below:

| $CHClF_2$ Flow Rate, Moles/hr. | $CHClF_2$ Inlet Temp., ° C. | Steam Flow Rate, Moles/hr. | Steam Inlet Temp., ° C. | Exit Temp., ° C. | Dilution Ratio | Conversion, Percent | Efficiency, Percent |
|---|---|---|---|---|---|---|---|
| 26 | 500 | 170 | 950 | 645 | 6.5 | 76.2 | 96.4 |
| 62 | 480 | 335 | 950 | 665 | 5.4 | 67.2 | 97.5 |
| 24 | 520 | 140 | 950 | 670 | 5.8 | 88.5 | 95.4 |
| 60 | 500 | 285 | 950 | 675 | 4.8 | 60.2 | 97.6 |
| 69 | 400 | 350 | 960 | 680 | 5.8 | 57.8 | 97.3 |
| 41 | 490 | 240 | 945 | 690 | 5.9 | 78.7 | 96.3 |
| 89 | 460 | 450 | 945 | 700 | 5.1 | 54.2 | 98.2 |
| 60 | 500 | 352 | 950 | 700 | 5.9 | 63.1 | 97.3 |
| 54 | 400 | 360 | 950 | 700 | 6.7 | 69.8 | 96.7 |
| 47 | 500 | 285 | 950 | 700 | 6.1 | 70.6 | 96.8 |
| 47 | 400 | 336 | 950 | 700 | 7.2 | 74.3 | 96.4 |
| 39 | 400 | 280 | 950 | 700 | 7.2 | 80.8 | 94.9 |
| 30 | 250 | 220 | 985 | 700 | 7.3 | 86.2 | 94.5 |
| 75 | 345 | 720 | 890 | 720 | 9.6 | 52.7 | 98.4 |
| 64 | 25 | 620 | 950 | 720 | 9.7 | 57.5 | 98.3 |
| 43 | 510 | 470 | 850 | 720 | 10.9 | 65.0 | 98.4 |
| 43 | 350 | 510 | 880 | 720 | 11.9 | 69.3 | 97.7 |
| 96 | 295 | 940 | 900 | 730 | 9.8 | 47.0 | 98.6 |
| 24 | 420 | 255 | 950 | 750 | 10.6 | 92.0 | 94.3 |
| 64 | 350 | 700 | 950 | 770 | 10.9 | 72.2 | 97.7 |
| 32 | 400 | 620 | 900 | 810 | 19.4 | 91.2 | 94.4 |
| 43 | 375 | 635 | 970 | 815 | 14.8 | 90.6 | 96.0 |
| 32 | 410 | 590 | 945 | 820 | 18.4 | 93.2 | 95.1 |
| 26 | 420 | 655 | 970 | 875 | 25.2 | 96.2 | 89.1 |

If the efficiency is plotted against the conversion for those results of this example that have an exit temperature of 700° C., and the data given in Example 1 are plotted on the same graph, it will be seen that the conversion-efficiency relationship is considerably better for the results of this example than for those of Example 1 in which the dilution ratio was 3, and very much better than for the control experiments in which no steam was added.

It will be apparent that considerably higher efficiency is attained at any conversion when monochlorodifluoromethane is pyrolysed according to the process of the present invention.

Example 3

Monochlorodifluoromethane was passed via an orifice plate flow-meter through a tubular preheater, and thence through a lagged tube to a mixing zone in a tubular "Inconel" reaction vessel while at the same time, steam was passed via an orifice plate flow-meter, a preheater and a superheater to the same mixing zone in the reaction vessel. The temperatures of the monochlorodifluoromethane and steam immediately prior to mixing, and of the reaction gas mixture at the exit of the reaction vessel, were all measured with thermocouples, and recorded automatically. The reaction vessel was 31½" long and 6" in diameter. The reactor walls were not heated electrically so that the reaction was not strictly adiabatic. Reliance was placed on the sensible heat of the steam and monochlorodifluoromethane to give the required heat input and achieve the desired reaction temperature. Because of unavoidable heat losses between the preheater and reaction vessel, the temperature of the monochlorodifluoromethane prior to mixing was only ca. 200° C. The gases leaving the pyrolysis zone were quenched by injecting sprays of water and hydrochloric acid and then passed through a carbon-block cooler which reduced the gas mixture temperature to about 110° C. This was followed by a condenser in which most of the hydrochloric acid separated and then a scrubbing system. The pressure in the reaction vessel was approximately 1 atmosphere absolute. The product gases were analysed by gas-liquid partition chromatography and the conversion and efficiency calculated by the method described in Example 2. It will be seen from the figures in the following table that the experiments of Example 3 were on a considerably larger scale than those of Example 2. The tetrafluoroethylene produced in this reaction was separated from unchanged monochlorodifluoromethane, which was recycled, and undesired by-products, and was then used for the production of polytetrafluoroethylene.

| | Contact Time (secs.) | $CHF_2Cl$ flow rate kg. moles/ hr.$^{-1}$ | $CHF_2Cl$ inlet temp., °C. | Steam flow rate kg. moles/ hr.$^{-1}$ | Steam inlet temp., °C. | Exit Temp., °C. | Dilution Ratio | Conversion, Percent | Efficiency loss as High boilers, Percent | Efficiency loss as CO, Percent |
|---|---|---|---|---|---|---|---|---|---|---|
| 1 | 0.0536 | 1.29 | 225 | 12.0 | 945 | 623 | 9.3 | 59.7 | 1.86 | 1.69 |
| 2 | 0.0548 | 1.30 | 220 | 11.75 | 950 | 636 | 9.04 | 73.5 | 2.36 | 1.69 |
| 3 | 0.0521 | 1.29 | 222 | 12.0 | 960 | 650 | 9.3 | 83.6 | 3.26 | 2.08 |
| 4 | 0.0530 | 1.30 | 220 | 11.75 | 955 | 650 | 9.04 | 79.8 | 3.21 | 1.47 |
| 5 | 0.0569 | 1.41 | 210 | 10.75 | 955 | 650 | 7.62 | 66.8 | 2.52 | 1.21 |
| 6 | 0.0631 | 1.45 | 230 | 9.5 | 970 | 650 | 6.55 | 73.7 | 3.41 | 1.43 |
| 7 | 0.0499 | 1.39 | 215 | 12.4 | 920 | 655 | 8.93 | 78.7 | 3.47 | 1.74 |
| 8 | 0.0574 | 1.55 | 220 | 10.2 | 950 | 673 | 6.6 | 78.0 | 2.81 | 1.83 |
| 9 | 0.0505 | 1.34 | 223 | 12.0 | 950 | 675 | 8.96 | 73.3 | 3.0 | 1.75 |
| 10 | 0.0505 | 1.34 | 225 | 12.0 | 940 | 676 | 8.96 | 84.1 | 3.48 | 2.48 |
| 11 | 0.0505 | 1.25 | 225 | 12.0 | 950 | 680 | 9.60 | 83.5 | 3.04 | 2.28 |
| 12 | 0.0505 | 1.25 | 225 | 12.0 | 950 | 680 | 9.60 | 84.1 | 3.21 | 1.67 |
| 13 | 0.0500 | 1.32 | 230 | 12.0 | 940 | 684 | 9.09 | 79.6 | 3.43 | 2.37 |
| 14 | 0.0502 | 1.29 | 220 | 12.0 | 943 | 685 | 9.3 | 84.2 | 3.58 | 2.22 |
| 15 | 0.0511 | 1.30 | 220 | 11.75 | 950 | 685 | 9.04 | 84.0 | 3.41 | 2.30 |
| 16 | 0.0499 | 1.32 | 220 | 12.0 | 945 | 687 | 9.09 | 80.2 | 3.45 | 2.10 |
| 17 | 0.0499 | 1.27 | 230 | 12.0 | 945 | 692 | 9.45 | 82.7 | 3.75 | 2.52 |

ANALYSIS OF GASEOUS PRODUCTS OF THE FOREGOING EXPERIMENTS AFTER REMOVAL OF STEAM AND HCl PERCENT BY VOLUME

| | $CHF_3$ | $CF_2=CFH$ | $CH_2F_2+c-C_3F_6$ | $CF_2=CFCF_3$ | $CF_2Cl_2$ | $c-(CF_2)_4$ | $H(CF_2)_2Cl$ | $H(CF_2)_3Cl$ | CO | $C_2F_4$ | $CHF_2Cl$ |
|---|---|---|---|---|---|---|---|---|---|---|---|
| 1 | 0.146 | 0.015 | 0.016 | 0.150 | 0.098 | 0.152 | 0.043 | 0.040 | 1.43 | 40.7 | 57.2 |
| 2 | 0.170 | 0.021 | 0.009 | 0.252 | 0.151 | 0.303 | 0.085 | 0.078 | 1.95 | 55.3 | 41.7 |
| 3 | 0.242 | 0.052 | 0.038 | 0.390 | 0.216 | 0.540 | 0.150 | 0.122 | 2.95 | 67.2 | 28.1 |
| 4 | 0.202 | 0.036 | 0.020 | 0.358 | 0.206 | 0.506 | 0.144 | 0.128 | 1.95 | 63.2 | 33.3 |
| 5 | 0.183 | 0.016 | 0.024 | 0.226 | 0.122 | 0.283 | 0.100 | 0.073 | 1.20 | 48.0 | 49.8 |
| 6 | 0.173 | 0.027 | 0.013 | 0.345 | 0.185 | 0.483 | 0.149 | 0.106 | 1.68 | 55.5 | 41.4 |
| 7 | 0.252 | 0.037 | 0.018 | 0.540 | 0.205 | 0.474 | 0.150 | 0.136 | 2.30 | 62.8 | 33.1 |
| 8 | 0.212 | 0.032 | 0.016 | 0.353 | 0.208 | 0.446 | 0.056 | 0.045 | 2.33 | 60.6 | 35.7 |
| 9 | 0.179 | 0.028 | 0.031 | 0.295 | 0.160 | 0.397 | 0.117 | 0.096 | 2.03 | 54.8 | 41.9 |
| 10 | 0.241 | 0.046 | 0.032 | 0.421 | 0.233 | 0.580 | 0.169 | 0.149 | 3.56 | 67.5 | 27.1 |
| 11 | 0.239 | 0.044 | 0.011 | 0.379 | 0.213 | 0.486 | 0.152 | 0.117 | 3.23 | 67.0 | 28.1 |
| 12 | 0.262 | 0.041 | 0.013 | 0.411 | 0.230 | 0.518 | 0.165 | 0.133 | 2.41 | 68.6 | 27.2 |
| 13 | 0.226 | 0.037 | 0.014 | 0.388 | 0.216 | 0.518 | 0.162 | 0.133 | 3.10 | 61.7 | 33.5 |
| 14 | 0.268 | 0.050 | 0.034 | 0.435 | 0.238 | 0.592 | 0.172 | 0.154 | 3.20 | 67.8 | 27.1 |
| 15 | 0.217 | 0.047 | 0.011 | 0.438 | 0.248 | 0.570 | 0.160 | 0.146 | 3.30 | 67.7 | 27.2 |
| 16 | 0.257 | 0.042 | 0.026 | 0.393 | 0.220 | 0.522 | 0.157 | 0.127 | 2.78 | 62.6 | 32.9 |
| 17 | 0.258 | 0.051 | 0.018 | 0.465 | 0.262 | 0.590 | 0.178 | 0.146 | 3.49 | 65.0 | 29.5 |

We claim:

1. In a process for the production of tetrafluoroethylene by the pyrolysis of monochlorodifluoromethane, the improvement which comprises passing under substantially adiabatic conditions a mixture of monochlorodifluoromethane and from three to nineteen moles of preheated steam per mole thereof through a zone in which the monochlorodifluoromethane is pyrolyzed at a temperature in the range of 600°–800° C., and then quenching the resulting mixture of pyrolysis products, sufficient heat being contained in the preheated steam to bring the gas mixture to the temperature of pyrolysis and the rate of passage through said zone being such that the steam and monochlorodifluoromethane are in contact with each other for a period of from 0.01 to 1 second.

2. A process according to claim 1 in which from 6 to 10 moles of steam are used per mole of monochlorodifluoromethane.

3. A process according to claim 1 in which there is substantially plug flow of the gas mixture undergoing pyrolysis, with good local turbulence but freedom from back mixing, at a Reynolds number greater than 3000.

4. A process according to claim 8 in which the monochlorodifluoromethane is preheated to a temperature of 300–500° C. before entering the pyrolysis zone.

5. A process according to claim 1 in which up to 10% of the monochlorodifluoromethane is pyrolysed before dilution with steam and before entering the pyrolysis zone.

6. A process according to claim 1 in which the pressure in the pyrolysis zone is substantially atmospheric.

7. A process according to claim 9 in which the washed gases are dried with concentrated sulphuric acid.

8. A process according to claim 1 wherein said mixture is formed by bringing together monochlorodifluoromethane at a temperature of from room temperature to 600° C. and from 3 to 19 moles of steam per mole thereof at a temperature of 800 to 1000° C.

9. A process according to claim 1 in which the gases leaving the pyrolysis zone are cooled, thereafter washed and dried and the tetrafluoroethylene is then recovered from the dried gases by fractional distillation.

References Cited by the Examiner

UNITED STATES PATENTS 2,994,723   8/1961   Scherer et al. _____ 260—653.3

FOREIGN PATENTS 1,216,649   4/1960   France.
35–15353   10/1960   Japan.

OTHER REFERENCES

Hudlicky: Chemistry of Organic Fluorine Compounds, page 268 (1962), Macmillan, New York, New York.

LEON ZITVER, *Primary Examiner.*

DANIEL D. HORWITZ, *Examiner.*